Sept. 15, 1964 W. J. CONOVER 3,148,663
FARROWING LAYOUT
Filed March 4, 1963 4 Sheets-Sheet 1

INVENTOR
WILLIAM J. CONOVER
BY
Dick, Zarley & Henderson
ATTORNEYS

Sept. 15, 1964  W. J. CONOVER  3,148,663
FARROWING LAYOUT
Filed March 4, 1963  4 Sheets-Sheet 2
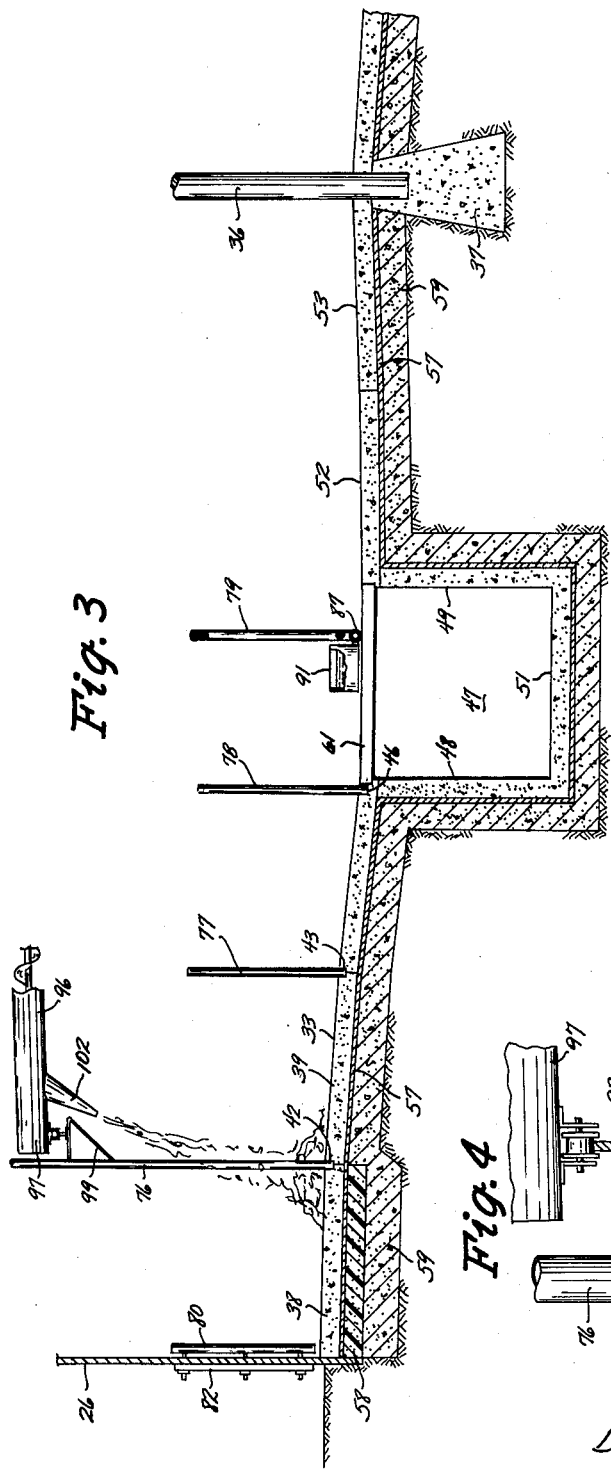
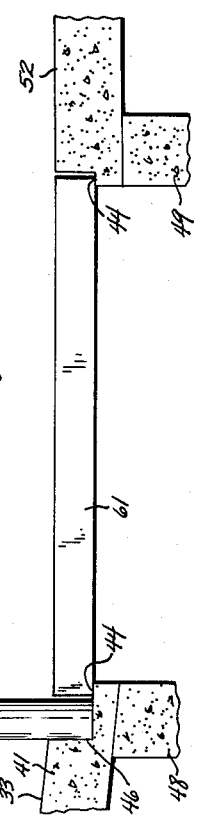
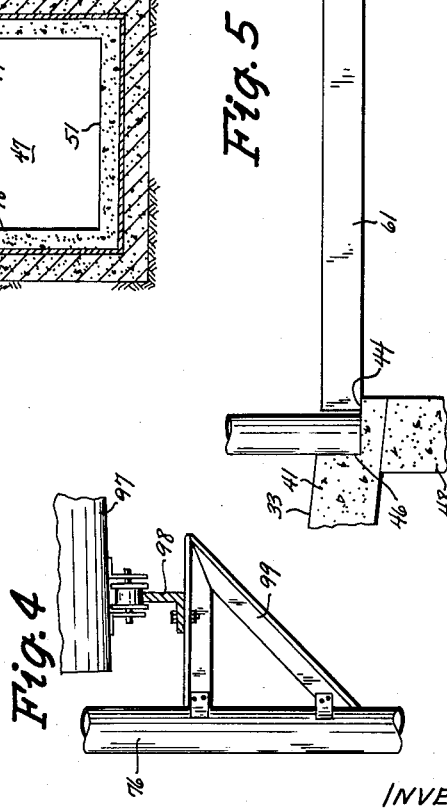
INVENTOR
WILLIAM J. CONOVER
BY
Dick, Zarley & Henderson
ATTORNEYS

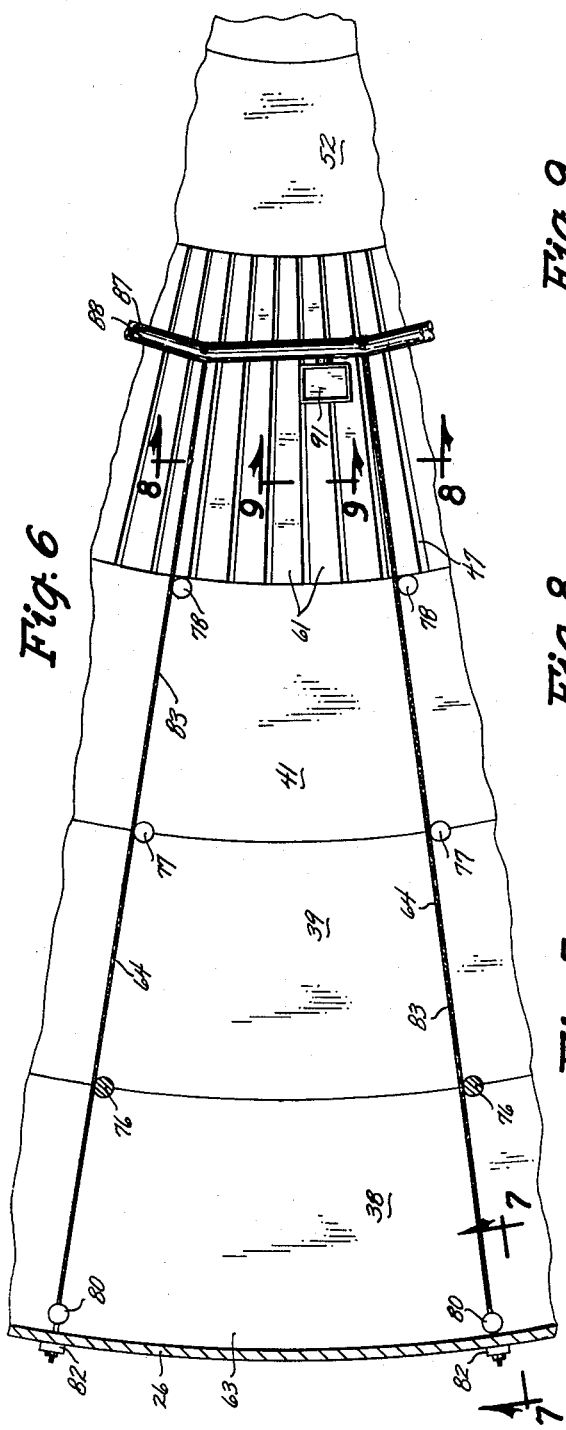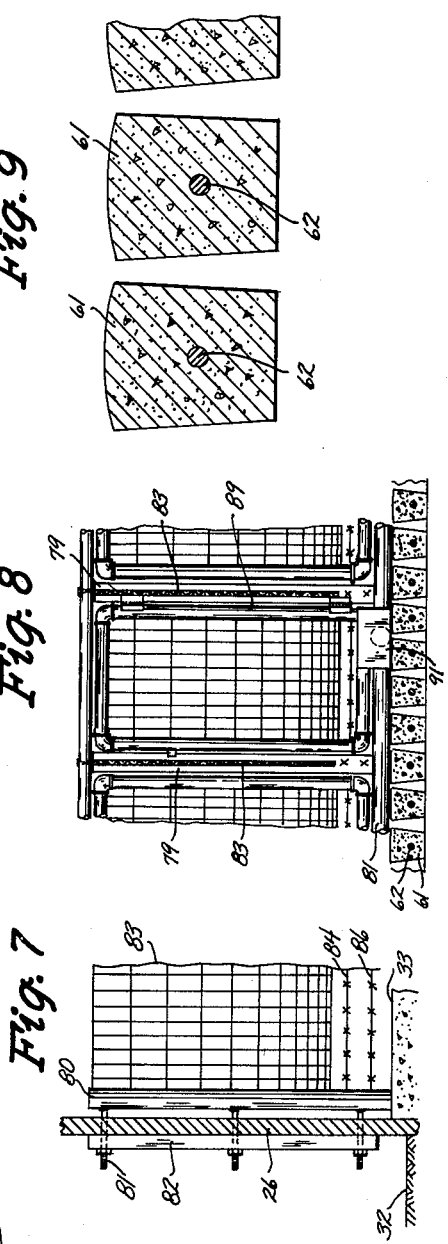

Sept. 15, 1964     W. J. CONOVER     3,148,663
FARROWING LAYOUT
Filed March 4, 1963     4 Sheets—Sheet 4
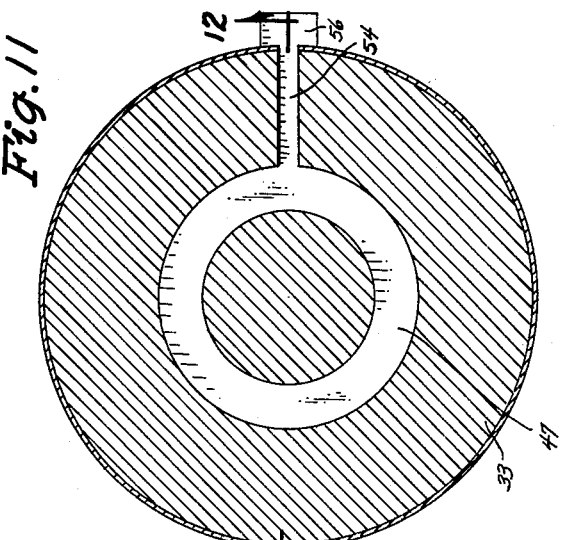
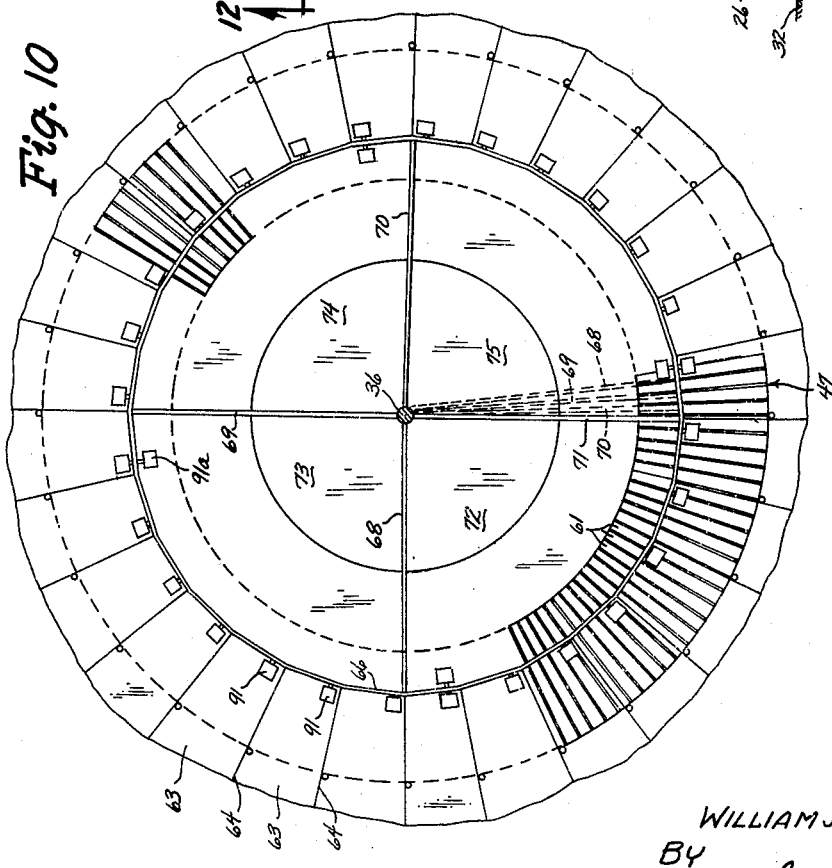
INVENTOR
WILLIAM J. CONOVER
BY
Dick, Zarley & Henderson
ATTORNEYS

United States Patent Office 3,148,663
Patented Sept. 15, 1964

3,148,663
FARROWING LAYOUT
William J. Conover, Rhodes, Iowa
Filed Mar. 4, 1963, Ser. No. 262,472
7 Claims. (Cl. 119—16)

This invention relates to new and useful improvements in livestock farms and particularly to a farrowing layout.

It is an object of the invention to provide an improved farrowing layout wherein the entire farrowing-to-market process of raising pigs is substantially automated for the operator's part.

It is another object of this invention to provide a farrowing layout wherein a conventional grain storage tank is adapted to provide grain to a protein mixing area, and from whence the feed is elevated to the upper area of a circular farrowing pen, to then be transmitted radially for circular dumping into a plurality of stalls.

Yet another object of this invention is to utilize the commercially available circular grain bin as a basis for a farrowing pen.

It is another object of this invention to provide within a circular bin a "package" type farrowing pen where all the necessities for raising livestock are provided within easy reach and utility by the operator.

A further object of this invention is to provide a farrowing pen having an improved sanitation arrangement, thus saving time and effort on the part of an operator in caring for the livestock.

Still another object of this invention is to provide an improved sanitation system for use in combination with a commercially available circular building for providing a new farrowing layout.

Yet another object of this invention is to provide a circular farrowing pen wherein a plurality of radially extended stalls enable the operator to segregate particular groups of livestock, to feed and inspect each group with a minimum of movement by him, and to readily move or separate one group or animals within a group from one area to another.

It is another object of this invention to provide an improved farrowing pen wherein a circular building is utilized to provide a plurality of radially extended, contiguous stalls, each of which opens into a variably segmentized center area, and wherein a common sanitation and watering system is adapted to fulfill the needs of both outer and center stalls.

Another object of this invention is to provide a feeding arrangement wherein feed elevated into the pen from external thereof is transmitted from a central distribution point radially and arcuately to any one of a plurality of radially extended stalls.

Still another object of this invention is to provide a plurality of radially extended, arcuately contiguous stalls in a farrowing layout, wherein a common gate structure for the inner ends of said stalls includes as an integral part thereof a common water providing conduit for supplying water automatically to each stall.

It is another object of this invention to provide a pie-shaped farrowing stall having a concrete, sloping floor surface over approximately three-fourths the entire area of the stall, with a slatted floor at the remaining one-fourth area and at one end of the stall whereat the watering trough is located.

It is a further object of this invention to provide a farrowing layout which is economical, easily manufactured, readily assembled, and effective.

These objects, and other features and advantages of this invention will become readily apparent upon reference to the following description, when taken with the accompanying drawings wherein:

FIG. 3 is an enlarged, fragmentary, vertical sectional view of a radial portion of the farrowing pen as taken along the line 3—3 in FIG. 2;

FIG. 4 is an enlarged fragmentary side elevational view of a portion of the auger boom and track for radially distributing feed to the stalls;

FIG. 5 is an enlarged view of a detail of the sanitation slabwork for the farrowing pen;

FIG. 6 is a top plan view generally of one stall of the farrowing pen;

FIG. 7 is a vertical sectional view taken along the line 7—7 in FIG. 6;

FIG. 8 is a vertical sectional view taken along the line 8—8 in FIG. 6;

FIG. 9 is a vertical sectional view taken along the line 9—9 in FIG. 6;

FIG. 10 is a reduced, top plan view of the circular stall arrangement and showing the maneuverability of the center stall gates;

FIG. 11 is a reduced horizontal sectional view as taken through the entire floor of the farrowing pen; and FIG. 12 is a vertical sectional view as taken along the lines 12—12 in FIG. 11.

Figure 1:
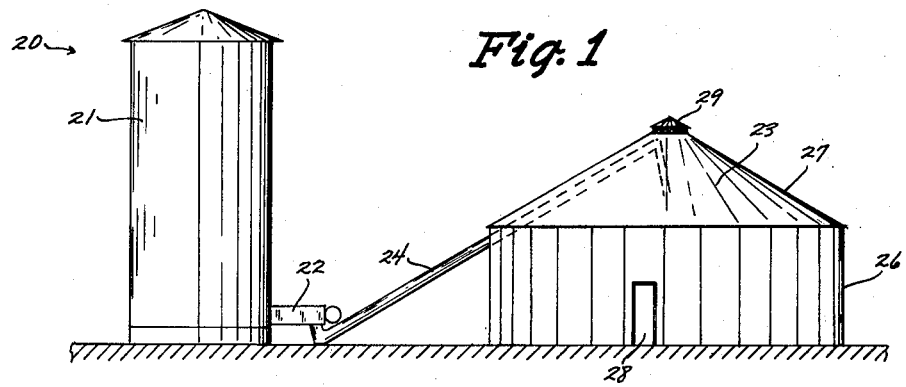
FIG. 1 is a side elevational view of the farrowing layout of this invention.

Referring now to the drawings, the livestock farrowing layout of this invention is indicated generally at 20 in FIG. 1, and comprises basically a storage tank 21, such as one for storing wet shelled corn, and which is provided with a bottom unloading device 22 or the like, and a circular farrowing pen 23. An elevated auger conveyor 24 is adapted at its lower end to receive grain from the unloading device 22 and extends upwardly through the side wall 26 of the pen 23 and beneath the roof 27 of the pen for discharging the grain.

It may be desirable to mix protein or like feed supplement with the grain prior to elevating it into the farrowing pen; therefore, at the junction of the unloading device 22 and the conveyor 24, a mixing apparatus such as a bulk tank unloader (not shown) can be interposed into the farrowing layout.

The farrowing pen can be of a circular, hollow structure the wall 26 of which is either corrugated or comprised of steel shaves having vertical and/or horizontal seams. A pair of doors 28 are provided in the wall 26 for the entry and exit of both humans and livestock. The roof 27 is depicted as the type used on grain bins, having a top center stack 29 below which a motorized fan 31 is mounted for ventilating the interior of the pen 23.

Figure 2:
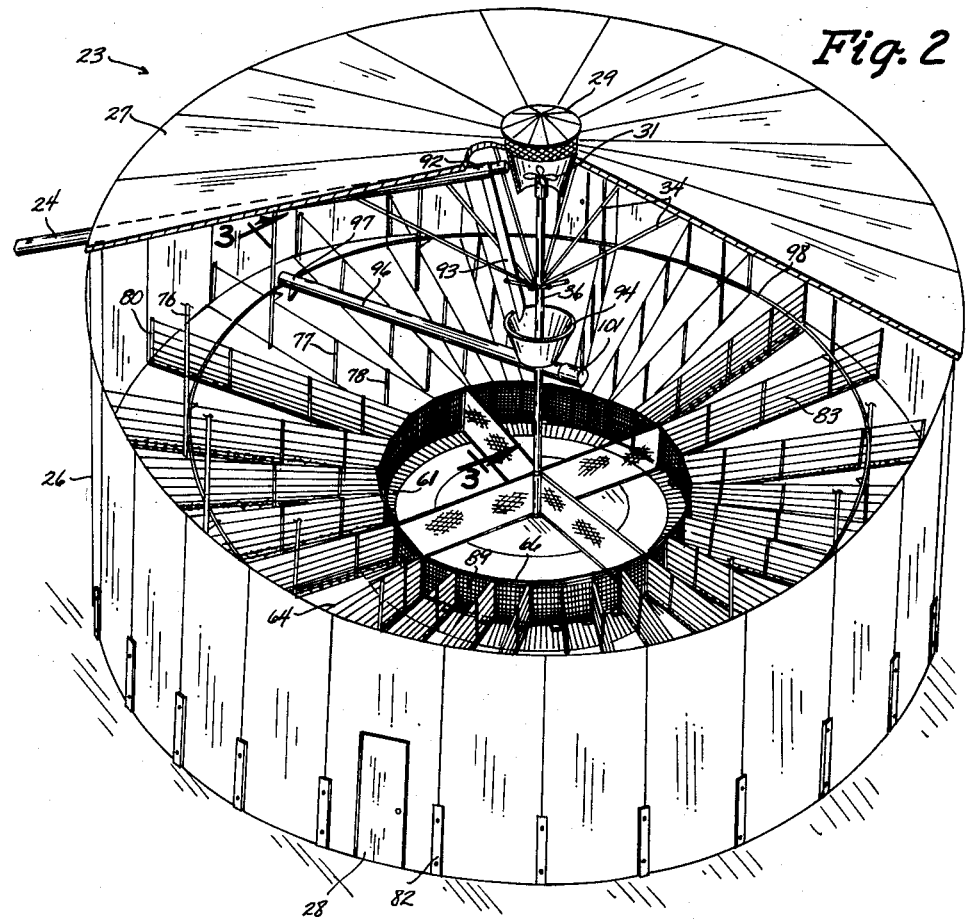
FIG. 2 is a perspective view of the farrowing pen, with a portion of the roof broken away to clearly show the interior thereof.

The farrowing pen 23 is supported above the ground 32 (FIG. 3) by a circular concrete floor 33, and as best illustrated in FIGS. 2 and 3 is supported further by an umbrella type structure 34 extended between the roof 27 and a ecnter pole 36. The pole 36 is secured in a foundation block 37 (FIG. 3) formed in the ground at the center of the pen 23, and which pole 36 extends upwardly through the floor 33.

Referring particularly to FIG. 3, a radial cross section of the floor 33 is shown, taken along a partition line as described in detail hereinafter. The outer layer 38 has a slight downward slope toward the center of the pen 23 of approximately one-fourth inch for every foot, the layer 38 being about four feet in width. The next layer 39, also approximately four feet in width, has a slope of about one half inch per foot, whereas the next layer 41, also some four feet in width, has a slope of approximately three-fourths inch per foot of width. At the junction of the concrete layers 38 and 39, a post socket 42 is formed, and a post socket 43 is formed at the junction of layers 39 and 41. Referring to FIG. 5, it is seen that the inner end of layer 41 has a shelf 44 formed, and with a post socket 46 also formed therein.

Below the inner edge of the layer 41 (FIGS. 3 and 5) a trench 47 is formed (and see FIGS. 11 and 12), the sides 48 and 49 of which are spaced apart approximately five feet, and the bottom 51 of which is about five feet deep. On the inner side of the trench 47, another layer 52 of concrete approximately three feet in radial width is laid, and which then has a gradual rise of approximately one-half inch per foot. This layer 52 is contiguous with the center circular layer 53 which has a rise of approximately three-fourths inch per foot of width. The radius of the center layer 53 is about four feet. It can thus be seen that the floor 33 slopes downwardly from its periphery to the trench 47 adjacent its center, and that the central area, comprising the concrete layers 52 and 53 also slope downwardly from the center of the pen 23 outwardly toward the trench 47.

Referring to FIGS. 11 and 12 particularly, the relationship of the trench 47 to the remainder of the concrete floor 33 is seen. Furthermore, a passage 54 leading radially outwardly from the trench 47 is provided for directing the livestock excretion and other sanitary flushings outwardly to a sump area 56. To aid in the flushing, the trench 47 and passage 54 slope downwardly toward the sump 56. From the sump 56, the flushings can be removed either manually or by machinery of several known types. Septic tanks or the like may be utilized.

Referring back particularly to FIG. 3, the flooring 33 of the farrowing pen 23 includes a sheet 57 of polyethylene which extends completely beneath all the concrete layers and to the outside of both walls. Furthermore, a slab 58 of styrofoam or the like is laid completely around and beneath the outer layer 38. A layer of gravel 59 (FIG. 3) is provided beneath the styrofoam slab 58 and beneath and to one side of the polyethylene sheet 57, separating these elements from the ground 32.

To provide a grate cover for the trench 47, a plurality of straight pre-formed concrete slabs 61 (FIGS. 5, 6 and 10) are provided. The slabs 61 are of approximately a five foot length sufficient to rest at each end upon a shoulder 44 (FIG. 5) of the concrete layers 41 and 52. They are also of a height and shape (FIG. 9) that their uper surfaces are flush with the surface of the adjacent floor layers 41 and 52. Additionally, their transverse width diminishes slightly from the outer end to the inner end. As seen in FIG. 9, the slabs 61 have slightly rounded top surfaces, aiding the cleaning thereof, and are each reinforced by a bar 62. By being radially spaced apart (FIG. 6), the slabs 61 form an effective grate through which the excrement of the livestock and other wastes may be flushed for drainage into and by the trench 47.

The interior of the farrowing pen 23 is divided into a plurality of identical stalls 65, one of which is seen in plan view in FIG. 6, by a plurality of fence-type identical partitions 64 and a circular gate framework 66. The framework 66 itself, in forming the inner end of the pie-shaped, radially extended, contiguous stalls 63, also forms a central area 67 (FIGS. 1 and 10). A plurality, four in number, of center gates 68, 69, 70 and 71 are all hingedly connected together at the center pole 36, and are swingable in a horizontal plane about the area 67 (FIG. 10). Each gate outer end is contiguous with the framework 66, and may be attached thereto at any location. Referring to FIG. 10, it is readily seen that four pie-shaped center stalls 72, 73, 74 and 75 may be formed by the center gates 68, 69, 70 and 71, or they may all be swung together, as shown in dotted lines, to form one large stall.

Referring now particularly to FIGS. 3, 6, 7, and 8, each fence partition 64 comprises a wall post 80, an outer post 76, a pair of intermediate posts 77 and 78, and an upright member 79 (FIG. 3) of the framework 66. The outer post 76 is inserted into the socket 42 and extends upwardly to the roof 27 of the pen 23. The intermediate posts 77 and 78 are inserted in the sockets 43 and 46 respectively. The wall post 80 (FIG. 7) rests on the floor 33 and is secured by a trio of bolts 81 extended through the side wall 26 to a vertical brace 82 on the outer side thereof.

A heavy duty hog wire fence 83 (FIGS. 7 and 8) is secured at one end to the post 80 and at its innermost extremity to the framework member 79. The fence 83 is supplemented by a pair of barbed wire strands 84 and 86 secured approximately two and four inches, respectively, above the floor 33. The framework 66 (FIG. 8), includes a lower horizontal tubular pipe 87 which extends completely around the pen (FIG. 10) directly above the trench slabs 61, an upper horizontal pipe 88, and the members 79 each forming the inner end of each fence. These members 87, 88 and 79 are preferably welded together. As best illustrated in FIG. 8, a gate 89 is hinged to each member 79 and adapted to latch with the opposite member 79 so that each stall 63 has a gate 89 at its innermost end.

The arrangement of farrowing stalls 63 and center stalls 72–75 having been described, it is to be noted that an automatic watering device 91 (FIG. 10) is mounted in each circular stall 63, over the trench 47, and also that a plurality of devices 91a are also extended into the center stalls, also over the trench 47. These devices 91 and 91a are tapped into the lower framework member 87 which doubles as a water supply pipe.

As mentioned hereinbefore, the auger conveyor 24 (FIGS. 1 and 2) extends upwardly beneath the roof 27 of the farrowing pen 23. At its upper end 92, it dumps the feed into a chute 93, which directs the falling feed into a circular bin 94 mounted on the center pole 36. From the bin 94, the fed is transmitted to a horizontally disposed auger boom 96 the outer end 97 (FIG. 4) of which rides on a rail 98. By the provision of the rail 98 mounted on a plurality of braces 99, each of which is secured to a post 76, operation of the motor 101 (FIG. 2) for the boom 96 results in circular rotation of the boom 96 around the pen 23, and with a concomitant discharge of feed from the bin 94 through a spout 102 and onto the floor (see FIG. 3) of each stall 63.

Thus, it is seen that a farrowing layout is provided where grain with or without supplement thereto is conveyed into a circular farrowing pen and then distributed automatically into each of a plurality of radially extended, contiguous stalls formed by fences, fence posts, and gates secured above a concrete floor which slopes toward a circular trench itself adapted to carry all material flushed into it to a sump area outside the pen, and where automatic watering devices are installed in each stall over the trench end at the end therein opposite the feed dumping end.

Some changes may be made in the construction and arrangement of my farrowing layout without departing from the real spirit and purpose of my invention, and it is my intention to cover by my claims, any modified forms of structure or use of mechanical equivalents which may be reasonably included within their scope.

I claim:

1. In a livestock farrowing layout:
   a pen having a roof and a substantially circular upstanding wall with a passage formed therein;
   a floor for said pen, said floor sloped downwardly from its periphery toward the center thereof;
   a plurality of partitions supported on said floor and forming a plurality of stalls in said pen;
   a substantially annular sanitation trough formed in said floor and passed beneath said stalls, said trough having a substantially annular inner wall radially spaced from the center of said pen to provide a central floor area within the confines of said trough; and
   means forming a grate over said trough.

2. In a livestock farrowing layout:
a pen having a roof and an upstanding wall with a passage formed therein;
a floor for said pen;
a plurality of partitions supported on said floor and forming a plurality of stalls within said pen, said stalls having inner closed ends spaced outwardly from the center of said floor and forming thereby a central floor area;
an endless sanitation trough formed in said floor and passed beneath said stalls, said floor sloped downwardly towards said trough; and
means forming a grate over said trough.

3. In a livestock farrowing layout:
a pen having a roof and an upstanding wall with a passage formed therein;
a floor for said pen;
a plurality of partitions supported on said floor and forming a plurality of stalls within said pen, said stalls having inner closed ends spaced outwardly from the center of said floor and forming thereby a central floor area;
an endless sanitation trough formed beneath the surface of said floor and passed beneath said stalls, said floor sloped downwardly towards said trough; and
open work means formed within said floor for transmitting liquid and solid wastes from the surface of said floor into said trough.

4. In a livestock farrowing layout:
a pen having a roof and a substantially circular upstanding wall with a passage formed therein;
a floor for said pen, said floor sloped downwardly form adjacent its periphery toward the center thereof;
a plurality of partitions supported on said floor and forming a plurality of stalls in said pen;
a substantially annular sanitation trough formed in said floor and passed beneath said stalls, said trough having a substantially annular inner wall radially spaced from the center of said pen to provide a central floor area within the confines of said trough, said central floor area adapted for human walking and working; and
means forming a grate over said trough.

5. In a livestock farrowing layout:
a pen having a roof and an upstanding wall with a passage formed therein;
a floor for said pen;
a plurality of partitions supported on said floor and forming a plurality of stalls in said pen, said partitions extended radially inwardly toward the center of said pen, and said stalls having inner closed ends spaced outwardly from the center of said floor and forming thereby a central floor area;
an endless sanitation trough formed in said floor and passed beneath said stalls, said floor sloped downwardly toward said trough; and
means forming a grate over said trough.

6. In a livestock farrowing layout:
a pen having a roof and an upstanding wall with a passage formed therein;
a floor for said pen;
a plurality of partitions supported on said floor and forming a plurality of stalls within said pen, said stalls having inner closed ends spaced outwardly from the center of said floor and forming thereby a central floor area;
an endless sanitation trough formed in said floor and passed beneath said stalls, said floor sloped downwardly towards said trough;
means forming a grate over said trough; and
an animal watering device mounted in each stall over said trough.

7. In a livestock farrowing layout:
a pen having a roof and a substantially circular upstanding wall with a passage formed therein;
a floor for said pen, said floor sloped downwardly from its periphery toward the center thereof;
a plurality of partitions supported on said floor and forming a plurality of stalls in said pen, said stalls having inner closed ends combining with each other to form a substantially annular partition wall radially spaced from the center of said pen to provide a central floor area within the confines of said stalls;
a substantially annular sanitation trough formed in said floor and passed beneath said stalls;
means forming a grate over said trough; and
a plurality of separate gates movably mounted within said central floor area, each gate hingedly connected at an inner end to the inner ends of the other gates at the center of said central floor area, each gate radially extended outwardly from said center to a position contiguous with said partition wall.

References Cited in the file of this patent

UNITED STATES PATENTS

| | | |
|---|---|---|
| 2,222,680 | Morris et al. | Nov. 26, 1940 |
| 2,704,051 | Heiskell | Mar. 15, 1955 |
| 2,735,400 | Stubbs | Feb. 21, 1956 |
| 2,835,223 | Erickson | May 20, 1958 |
| 2,883,076 | Palmer | Apr. 21, 1959 |
| 3,021,025 | Sudenga et al. | Feb. 13, 1962 |
| 3,021,819 | Krahn | Feb. 20, 1962 |
| 3,042,000 | McMurray et al. | July 3, 1962 |
| 3,095,855 | Mead | July 2, 1963 |
| 3,097,625 | Sievers | July 16, 1963 |
| 3,097,627 | Garcia | July 16, 1963 |
| 3,108,571 | Patz | Oct. 29, 1963 |

FOREIGN PATENTS

| | | |
|---|---|---|
| 1,078,945 | Germany | Mar. 31, 1960 |

OTHER REFERENCES

Iowa Farm Science Publication, vol. 16, No. 9, March 1962, pages 136 and 137.